United States Patent [19]
Mitty et al.

[11] Patent Number: 6,145,079
[45] Date of Patent: Nov. 7, 2000

[54] SECURE ELECTRONIC TRANSACTIONS USING A TRUSTED INTERMEDIARY TO PERFORM ELECTRONIC SERVICES

[75] Inventors: Todd Jay Mitty, New York, N.Y.; Douglas Scott Shoupp, Wheaton, Ill.; Ajit Mathias Prabhu, Murray Hill, N.J.; Michael Robert Cantone, Wheeling, Ill.

[73] Assignee: Deloitte & Touche USA LLP, Wilton, Conn.

[21] Appl. No.: 09/036,280

[22] Filed: Mar. 6, 1998

[51] Int. Cl.[7] ........................................................ H04L 9/00
[52] U.S. Cl. ........................... 713/170; 713/153; 713/176; 705/64; 380/37
[58] Field of Search ............................... 705/64; 713/176, 713/170, 153; 380/37

[56] References Cited

U.S. PATENT DOCUMENTS

| | | | |
|---|---|---|---|
| 5,544,255 | 8/1996 | Smithies et al. | 382/119 |
| 5,553,145 | 9/1996 | Micali | 380/30 |
| 5,629,982 | 5/1997 | Micali | 380/30 |
| 5,642,419 | 6/1997 | Rosen . | |
| 5,666,420 | 9/1997 | Micali | 380/30 |
| 5,673,316 | 9/1997 | Auerbach et al. | 380/4 |
| 5,790,665 | 8/1998 | Micali et al. . | |
| 5,838,814 | 11/1998 | Moore . | |
| 5,883,956 | 3/1999 | Le et al. | 380/4 |

OTHER PUBLICATIONS

Chaum (1989) *Security and Protection in Information Systems*, Elsevier Science Publishers B.V. pp. 239–241.
Chaum (1981) *Communications of the AMC* 23(2):84–87.
Even et al. (1985) *Communications of the AMC* 28(6):637–647.
Muftic (1990) *Computers & Security* 9:245–255.
Rabin (1983) *Journal of Computer and Systems Sciences* 27:256–267.
Blum (1983) *ACM Transactions on Computer Systems* 1:175–193.
Vazirani et al. (1983) *Proceedings of the 24th IEEE Symposium on of Foundations of Computer Science* pp. 23–30.
Donal O'Mahoney, "Electronic Payment Systems", Boston: Artech House, 1997, pp. 35–37.

*Primary Examiner*—Thomas R. Peeso
*Assistant Examiner*—Todd Jack
*Attorney, Agent, or Firm*—Kramer, Levin, Naftalis and Frankel LLP

[57] ABSTRACT

Secure electronic transactions using a trusted intermediary with non-repudiation of receipt and contents of message. A system of, and method for, securely transmitting a package from a sender to a recipient, via an intermediary, are described, as is a novel data arrangement, stored in a computer-readable medium. A sender encrypts the message to form an encrypted inner envelope. A waybill is formed that among other things identifies the recipient as the destination and includes information indicating various levels of services desired, e.g., electronic notarization. The waybill and inner envelope are used to form an encrypted outer envelope that is addressed to a trusted intermediary. The intermediary receives the package and decrypts the outer envelope. It is unable to decrypt the inner envelope, due to the keys employed during encryption. The service information is processed, and the package is used to form a second package addressed to the recipient. The recipient decrypts the package and confirms receipt thereof, using a digest of the message. In this way, receipt and opening of the message cannot be properly repudiated by the recipient. An extra level of encryption to form an outer envelope from the intermediary to the recipient may be included, and the various envelopes and confirmation digests may be signed so that the contents and identities may be authenticated.

8 Claims, 11 Drawing Sheets

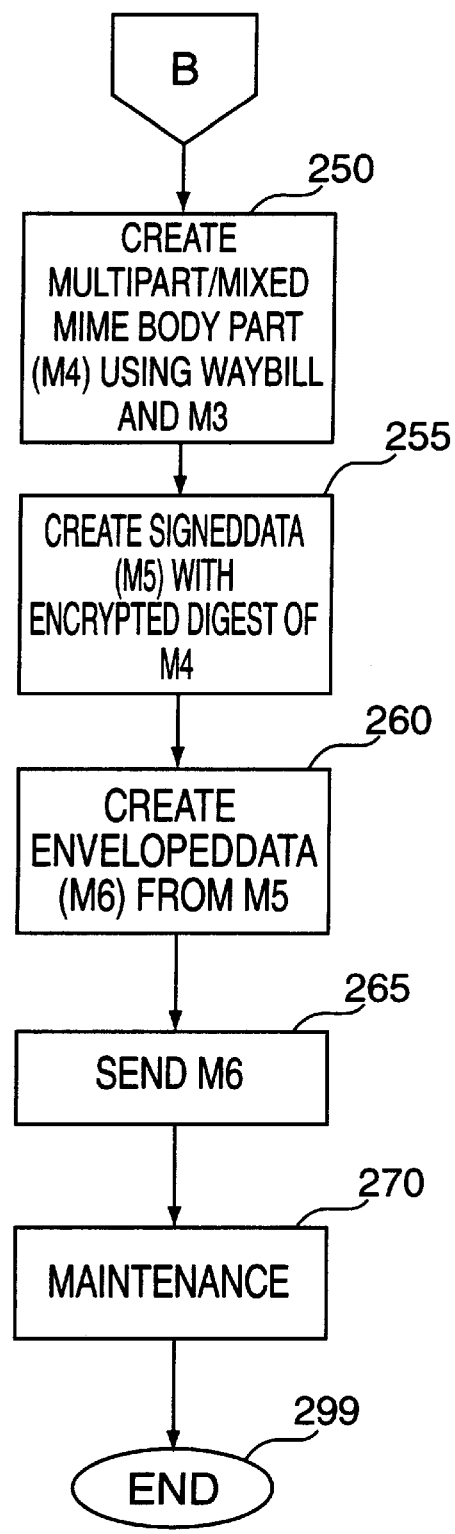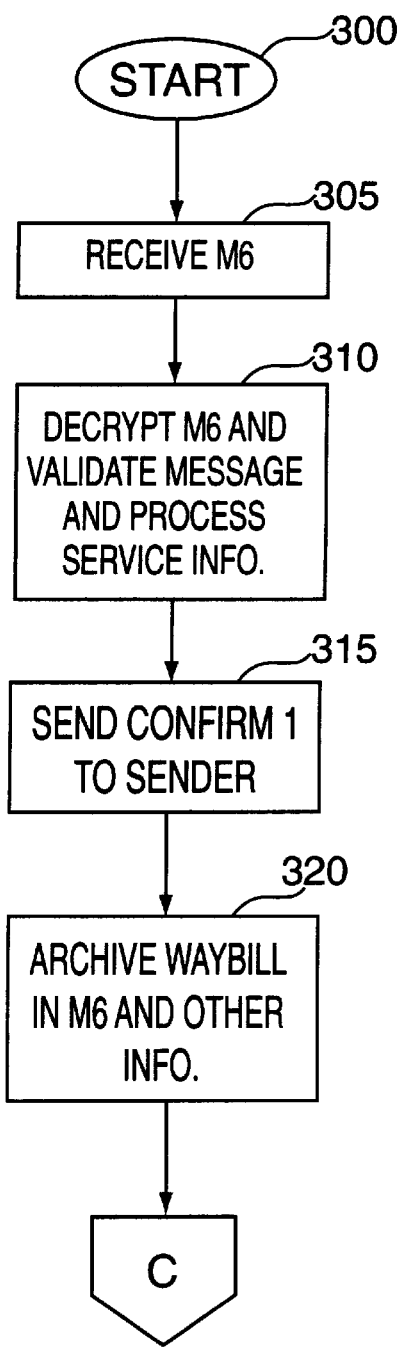
FIG. 2CFIG. 3A

ENVELOPEDDATA 605 (M6 OR M10)

SIGNEDDATA 610 (M5 OR M9)

MULTIPART/MIXED 615 (M4 OR M8)

TEXT/ PLAIN 620 (WAYBILL)

ENVELOPEDDATA 625(M3)

SIGNEDDATA 630(M2)

VALUED CONTENT 635(M1)

SECURE ELECTRONIC TRANSACTIONS USING A TRUSTED INTERMEDIARY TO PERFORM ELECTRONIC SERVICES

BACKGROUND OF THE INVENTION

1. Field of the Invention

This invention relates to secure electronic transactions and, more particularly, to electronic transactions that use a trusted intermediary to provide improved privacy, authentication, and non-repudiation.

2. Discussion of Related Art

To date, businesses have primarily used paper-based systems to deliver documents. Though there is increasing acceptance of electronic mail (e-mail) to deliver electronic messages, it is considered undesirable for certain transactions, particularly the delivery of important documents. Much of the criticism has focused on e-mail's deficiencies with regard to privacy, authentication, and non-repudiation.

Under conventional e-mail, an electronic eavesdropper can monitor the relevant communication medium and determine the contents of the message. Thus, the system lacks privacy. Moreover, there is no assurance that a received e-mail message has not been tampered with while it was in transit or that the message indeed originated from the indicated sender. Furthermore, though conventional e-mail has an ability to provide acknowledgements to a sender that a message has been received, the acknowledgments may be easily circumvented or falsified, and thus message receipt or delivery may be repudiated.

Secure e-mail systems have been proposed but are believed to be unsatisfactory in certain regards. For example, though secure e-mail encrypts the content of a message, the sender's and receiver's identity may be determined with electronic eavesdropping techniques. In many instances, this information in itself is important and needs to be protected.

Micali has disclosed techniques that may be used to form electronic message systems that provide "simultaneous electronic transactions," or SETs. See, e.g., U.S. Pat. Nos. 5,553,145 and 5,666,420. A SET is disclosed as an "electronic transaction that is simultaneous at least in a logically equivalent way, namely, it is guaranteed that certain actions will take place if and only if certain other actions take place." See, e.g., U.S. Pat. No. 5,553,145 at Col. 7, lines 52–55. "Simultaneity is guaranteed, rather than being just highly probable." See, e.g., U.S. Pat. No. 5,553,145 at Col. 8, lines 55–6. Under one arrangement a third party is used to facilitate the exchange of an encrypted message and a receipt, only if needed, i.e., one of the participants does not follow the protocol. U.S. Pat. No. 5,666,420 Under another arrangement, the third party is always visible and used to facilitate the exchange of encrypted messages for receipts. U.S. Pat. No. 5,553,145.

Micali includes only method claims and in this regard it is not clear whether Micali considers the disclosures as enabling to systems or devices. The techniques are disclosed at a generalized level with many variants, but there is essentially no disclosure of the devices, software, or specific algorithms. Thus, there is little or no disclosure on how to implement such a system in a real world context that must address regulatory concerns of encryption. Likewise, there is little or no disclosure of how to integrate the disclosed techniques with existing e-mail systems. These systems represent a large sunk cost both in terms of equipment and user-training.

There is a need in the art for an electronic message system that provides privacy, authentication of participants, and non-repudiation. There is, moreover, a particular need for an electronic message system in which it is difficult to detect that a given sender is sending a message to a given recipient. Preferably, the system should be adaptable to easily address the various regulatory requirements concerning encryption, and preferably, the system should address the myriad of ways in which users receive conventional e-mail.

SUMMARY

Through the use of a trusted intermediary and a novel combination of cryptography techniques, certain embodiments of the invention provide privacy, authentication, and non-repudiation. Besides protecting the contents of an electronic message, certain embodiments prevent an eavesdropper from being able to determine that a given sender is communicating with a given recipient. In addition, certain embodiments authenticate that the contents of a message have not been altered in transit and authenticate the identities of all involved parties. Lastly, the use of an intermediary allows many desirable services to be incorporated into the system, such as delivery tracking, insurance, electronic notary services, and the like. ("Electronic notary services" as used in this document does not imply any attestation; instead, the term implies that a transaction time, contents, and parties are authenticated.)

An exemplary embodiment provides a system of, and method for, securely transmitting a message from a sender to a recipient, via an intermediary capable of performing electronic services. The sender receives the message from a user and forms an encrypted inner envelope using a first cryptographic algorithm. The encrypted inner envelope contains the message and is decryptable by the recipient. The sender forms a first information structure associated with the inner envelope. The first information structure contains data identifying the recipient as a destination and identifies the desired electronic services. The sender forms an encrypted first information structure using a second cryptographic algorithm. The encrypted first information structure is decryptable by the intermediary, and the sender receives the encrypted inner envelope and encrypted first information structure and transmit them as a first package on the communication network. The intermediary receives the first package and decrypts the encrypted first information structure, using the second cryptographic algorithm, to determine the identifying data and the desired electronic services. The intermediary processes the transmission in accordance with the desired electronic services, and forms a second package. The second package contains the encrypted inner envelop and transmits the second package on the network. The recipient receives the second package, and decrypts the inner envelope, using the first cryptographic algorithm, to recover the message.

BRIEF DESCRIPTION OF THE DRAWINGS

In the Drawing,

FIGS. 2A–C are a flowchart of exemplary transmitter logic;

FIGS. 3A–C are a flowchart of exemplary intermediary logic for processing messages;

FIG. 6 is an exemplary data structure for containing a message;

DETAILED DESCRIPTION

Figure 1A:
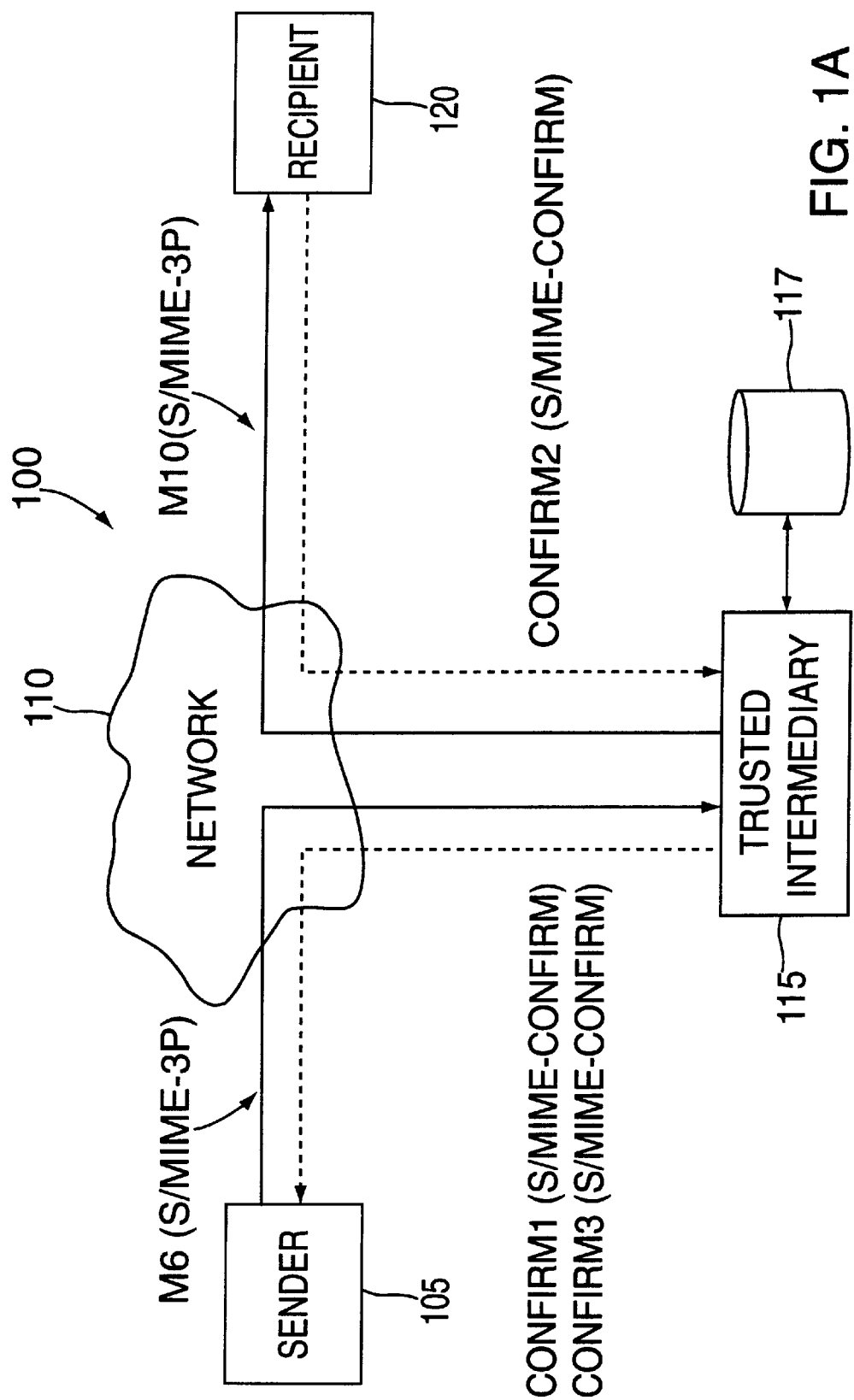
FIGS. 1A–B are top-level architectural views of an exemplary system.

Through the use of a trusted intermediary and a novel combination of cryptography techniques, certain embodiments of the invention provide privacy, authentication, and non-repudiation. Besides protecting the contents of an electronic message, certain embodiments prevent an eavesdropper from being able to determine that a given sender is communicating with a given recipient. ("Message" as used in this description means any digital payload and is not limited to text.) In addition, certain embodiments authenticate that the contents of a message have not been altered in transit and authenticate the identities of all involved parties.

Outline of Relevant Techniques and Standards

It is expected that persons of ordinary skill in the art related to this invention (skilled artisans) will know the techniques discussed in this section. Nonetheless, this outline is provided as a convenience to other readers who may be unfamiliar with these techniques. Skilled artisans will appreciate that this summary is educational in purpose and thus simplified.

a. Symetric and Public Kell Cryptography

There are two basic types of cryptography: symmetric and public key cryptography. In short, each type involves encrypting a message according to an encryption algorithm and a code, corresponding to the algorithm and user. This code is known as a "key." A corresponding decryption algorithm and key are used to recover, or decrypt, the encrypted message. Sometimes encrypting is called "enciphering" and decrypting is called "deciphering." The encrypted text is sometimes called "ciphertext" and the message and decrpyted message are sometimes called "clear text."

The mathematical characteristics of the algorithm and the key are such that it is effectively impossible to decrypt a message without knowing the key. This is so, even if the associated algorithms are known.

With symmetric cryptography, the same key is used for encrypting and decrypting. Thus, if A wants to send an encrypted message to B using this technique, A would have to reveal the key to B so that B could decrypt the message. This need to share the key is perceived as a vulnerability because the need for cryptography in itself assumes a non-secure channel.

With public key cryptography, a private key and a corresponding public key are generated and used as a pair. The private key can be used to encrypt messages that can only be decrypted with the public key. Likewise, the public key can be used to encrypt messages that can only be decrypted with the corresponding private key. For example, if A wants to send a message to B, A could do so by encrypting it with B's public key. Upon receiving it, B may then decrypt the message with its private key, and no other entity could similarly decrypt the message unless they had B's private key. Thus, with public key cryptography, a public key may be freely disclosed without compromising the process. This ability to share a key addresses the perceived vulnerability of symmetric cryptography. Unfortunately, modern public key techniques are computationally slower than symmetric techniques.

Symmetric and public key techniques may be combined to attain some of the advantages of each. In particular, a symmetric key may be generated and used to encrypt a message using symmetric encryption. Then, the symmetric key may be encrypted with a recipient's public key, and the combination of the encrypted message (encrypted with a symmetric key) and the encrypted key (i.e., the symmetric key that has been encrypted with the recipient's public key) may be sent to the recipient. When the recipient gets the combination of encrypted message and encrypted key, it first uses its private key and the corresponding public key decryption algorithm to decrypt the encrypted symmetric key. Then, it may decrypt the encrypted message using the decrypted symmetric key and the corresponding symmetric decryption algorithm. This combination of techniques offers the computational speed advantages of symmetric cryptography while avoiding the vulnerability of symmetric cryptography by sharing the symmetric key in a secure, encrypted way.

There are many known symmetric and public key algorithms. Some well known symmetric algorithms include RC2 and RC5 block cipher encryption and Triple DES encryption. A well known public key algorithm is the RSA public key cryptography algorithm. (RSA-encryption and RSA-decryption) In addition, there are known ways for managing and maintaining these keys. For example, techniques exist that allow secure, password-protected storage of keys and aging and "rolling-over" of such keys.

A more comprehensive overview of basic techniques may be found in APPLIED CRYPTOGRAPHY: PROTOCOLS, ALGORITHMS, AND SOURCE CODE IN C by Schneier (John Wiley & Sons 1995).

b. Digital Signatures

"Digital signatures" may be used to authenticate the contents of a message and the identity of the sender. In this fashion, a recipient can verify that a message has not been altered while in transit and that the message originated from the sender indicated with the message.

To form a digital signature, a variable-size message is processed according to a "digesting," or one-way function, such as a "hashing," function, to yield a fixed-sized "digest." (A digesting function is a one-way, irreversible transformation in which the digest, though representative of the message, cannot be used to recreate the message.) The digest is then encrypted with a sender's private key to yield a "digital signature" of the message and sender.

By combining a digital signature with the corresponding message, a recipient may authenticate the contents of the message and the identity of the sender. First, the recipient decrypts the digital signature with the sender's public key to recover the digest of the message. The received message is then digested with the same digest algorithm used to form the digest that was encrypted in the signature. The newly-formed digest is then compared to the recovered digest. If they are equal, it guarantees that the message came from an entity having the private key associated with sender and also guarantees that the document was not altered in transit. (The term "guaranteed" in this context is used as it is in the art and particularly refers to the extremely small probability of being able to circumvent the cryptographic techniques.) Notice that in the above description, signatures do not provide privacy; the message is never encrypted. Other mechanisms must be used for privacy.

c. Digital Certificates

"Digital certificates" are electronic documents used to facilitate electronic transactions. Each certificate is associated with an entity, such as an end-user or corporation, and includes information needed for electronic transactions, such as the entity's distinguished name, e-mail address, and public key. To facilitate the use of certificates, various arrangements have been proposed, including those specified by ITU standard X.509.

Digital certificates are typically issued by public or private "certificate authorities," (CAs) each of which may have CA-specific requirements about the information to be included in the certificate or CA-specific "vetting requirements" and certificate management. In short, a CA is an entity willing to vouch for the identities of those to whom it issues digital certificates. For example, it could be a company issuing digital certificates to its employees, a university to its students, a town to its citizens, etc. Some certificate authorities may merely accept the representations made in a request for a digital certificate, whereas other CAs may have more extensive procedures, such as requiring the requester to personally identify themselves with a passport or other corroborating information. The amount of vetting provided by a given CA along with the authority's reputation determine the assurance that is placed in digital certificates that it issues. The authority may use authority-specific management procedures by dating the certificates it issues as valid for only a given duration and by issuing certificate revocation lists ("CRLs") at different intervals to indicate which certificates are no longer recognized by the CA. The CA digitally signs the certificate so that the certificate may be authenticated.

d. Public Key Cryptography Standard #7 (PKCS7)

PKCS7 is a standard used in modern cryptographic applications. In short, it and its related standards specify a syntax for data structures and include definitions for several data structures. The syntax, by being generalized, is intended to have wide applicability. Software systems are available that provide PKCS7-compliant cryptographic services, such as software available from RSA Laboratories, a division of RSA Data Security, Inc.

The description below refers to several of the PKCS7 data types, primarily because they are part of the vocabulary used in the art and because an exemplary embodiment uses PKCS7-compliant software. Though the PKCS7 standard should be consulted for complete definitions, the following, simplified summaries are provided for convenience. These summaries focus on the material aspects of the definitions and are not intended to represent the complete PKCS7 definition.

digestedData: includes content of any type and a message digest of the content. A process of constructing such a data structure is defined in the standard, which includes mechanisms for identifying the associated digest algorithm.

signedData: includes content of any type and encrypted message digests of the content for zero or more signers. Thus, signedData provides a combination of a digital signature and content that may be used for authentication. A process of constructing such a data structure is defined in the standard, which includes mechanisms for identifying the associated encryption and digest algorithms. The structure includes signer information, which among other things includes the signer's certificate.

envelopedData: includes encrypted content of any type and encrypted content-encryption keys for one or more recipients. Thus, envelopedData is a structure that may be used for combining symmetric and public key cryptography. A process of constructing such a data structure is defined in the standard, which includes mechanisms for identifying the associated encryption algorithms.

e. MIME and S/MIME

MIME is a recognized standard for e-mail, such as Internet-based e-mail. Among other things, it and its related standards specify syntax for defining compatible data structures and specify certain recognized structures.

S/MIME is a recognized standard for sending "secure" e-mail. A core feature is its use of envelopedData for encapsulating the informational content to be sent.

There are many known software systems capable of transmitting the above type of structures. "SMTP services," which in turn involve yet more standards, is a somewhat generic term that may be used to define a class of such systems.

Outline of an Exemplary System and Information Flow

This section provides a top-level overview to better understand the flow of messages and the relationships between various entities. Later sections will describe each of the top-level elements in detail.

Figure 1B:
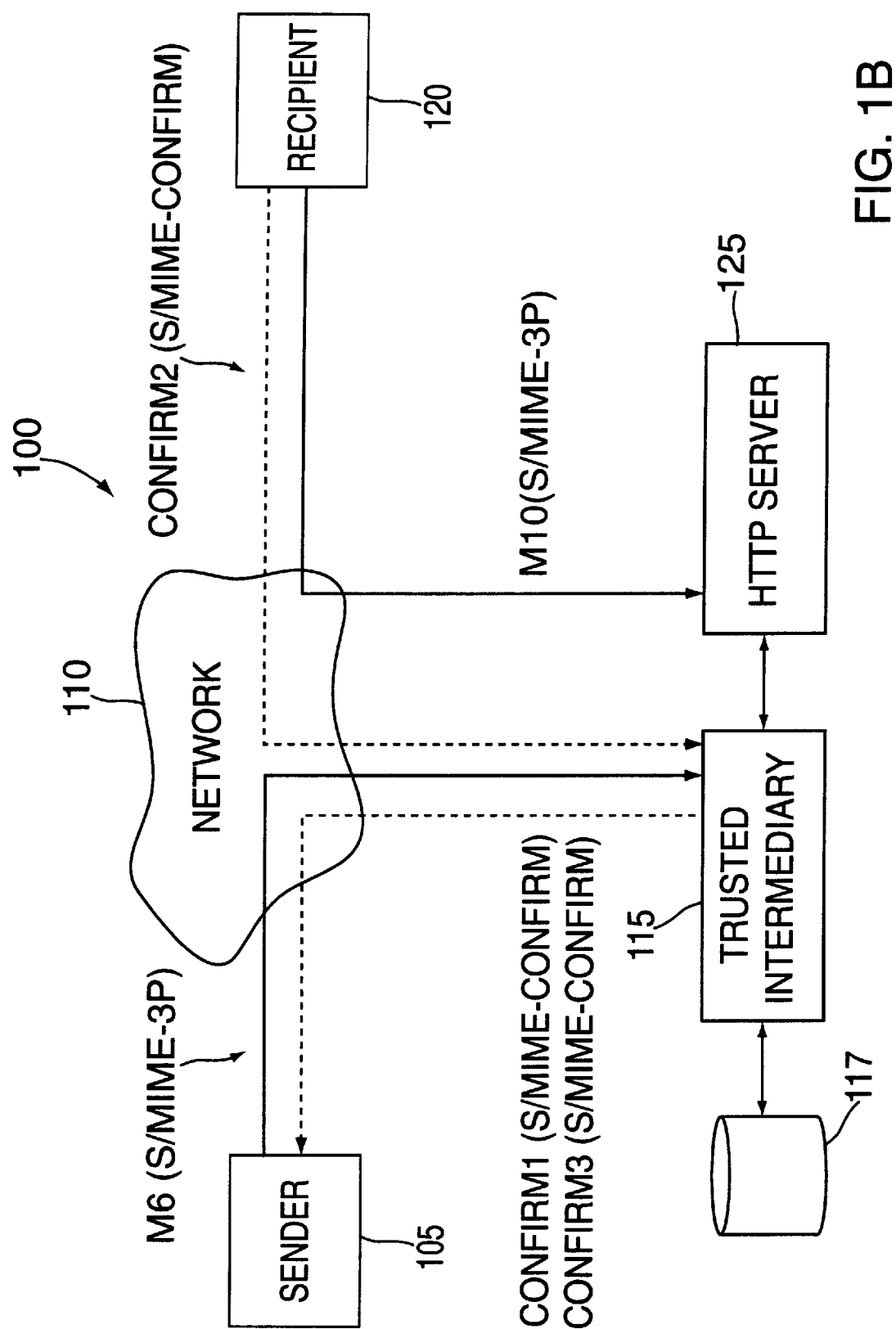

A top level architectural view of the system 100 is shown in FIG. 1A. An alternative embodiment is shown in FIG. 1B. Solid lines represent the flow of the message, and dashed lines represent confirmation messages, indicating that certain events have occurred.

Using techniques described below, sender 105 transmits a "package" to a trusted intermediary 115 via potentially non-secure network 110, such as the Internet. In this regard, the sender is preferably a computer but the term could include other devices. The trusted intermediary processes the package and sends a new version of the package to recipient(s) 120 via network 110. This processing may entail various forms of authentication, archiving, notarizing, billing, time-stamping, or the like. The new version of the package is eventually received by recipient(s) 120.

Various forms of confirmation messages may be sent. For example, a first confirmation message Confirm 1 may be sent from the intermediary to the sender when the package is received by the intermediary. Alternatively, this message may be omitted, or it may be sent when the intermediary sends the new version of the package. A second confirmation message Confirm 2 may be sent from the recipient to the intermediary when the intermediary has opened and/or authenticated the new version of the package. Confirm 2, besides indicating that the package was received and/or opened by the recipient can authenticate the contents of the package and thus provide non-repudiation. The confirmation will securely evince the contents of the message received and/or opened by the recipient, and thus the recipient may not later repudiate receiving and/or opening such a message. A third confirmation message Confirm 3 may be sent from the intermediary to the sender when the intermediary has received all of the Confirm 2 messages it expects for a given transaction; for example, this may be useful if the first package designates multiple recipients.

In short, both the original and new version of the package have an inner and outer "digital envelope." These digital envelopes are instances of envelopedData, and information they contain enable the system to provide privacy, authentication, and non-repudiation.

For the original package, i.e., the one transmitted from the sender 105 to the intermediary 115, the inner envelope has information that is intended only for the recipient(s) 120 and is encrypted accordingly. The outer envelope contains the inner envelope and other information, which is used to identify the recipients and the desired services, among other things. The intermediary 115 may recover this other information with the appropriate decryption, but it is unable to recover the message encrypted in the inner envelope.

For the new version of the package, i.e., the one transmitted from the intermediary 115 to the recipient(s) 120, the inner envelope is the same as the one in the original package. The outer envelope contains the inner envelope and other information. The recipient(s) 120 may then decrypt the package to recover the information that was intended for it.

Under an alternative embodiment, shown in FIG. 1B, the intermediary does not transmit the new package to the recipient. Instead, the new version is transferred to a HTTP server 125. This server 125 need not have any authentication, privacy, or non-repudiation logic. The intermediary 115, in this case, supplies information to the recipient 120 identifying the new package, for example, with a URL pointer. The recipient in turn loads the package from the HTTP server 125.

The following sections describe preferred software logic at the sender 105, intermediary 115, and recipient 120. Later sections define preferred structures for the packages as well as for the confirmations discussed above.

Exemplary Transmitter

Under an exemplary embodiment, sender 105 and recipient(s) 120 each include transmitting logic (transmitter) and receiving logic (receiver), even though the example of FIG. 1 illustrates information flowing in one direction only (if confirmations are excluded). A transmitter includes the logic for forming and sending the original packages referred to above. Though actual senders and recipients will typically include a variety of computing and communication platforms, an exemplary embodiment assumes a suitably-equipped personal computer or workstation. Among other things, a suitably-equipped personal computer would include an e-mail system enabled for MIME and S/MIME format packages and would have SMTP server access. Alternatively, HTTP or other network transport access may be used. It would also include RSA security service software and would include key and certificate management software. A suitably-equipped personal computer could include hardware security mechanisms, such as hardware tokens, for the storing and processing of private keys, or it could maintain private keys using software techniques. It would also include software for constructing the message that is desired to be sent. This software might include conventional e-mail software that can construct a message with its own editor, or it could include word processing applications, which can construct files that could be included as attachments to an e-mail message.

A "user" provides a message. In this regard, the user may be a human constructing a message with a conventional word processing or e-mail application, or it could include some other software agent that provides electronic messages.

Figure 2A:
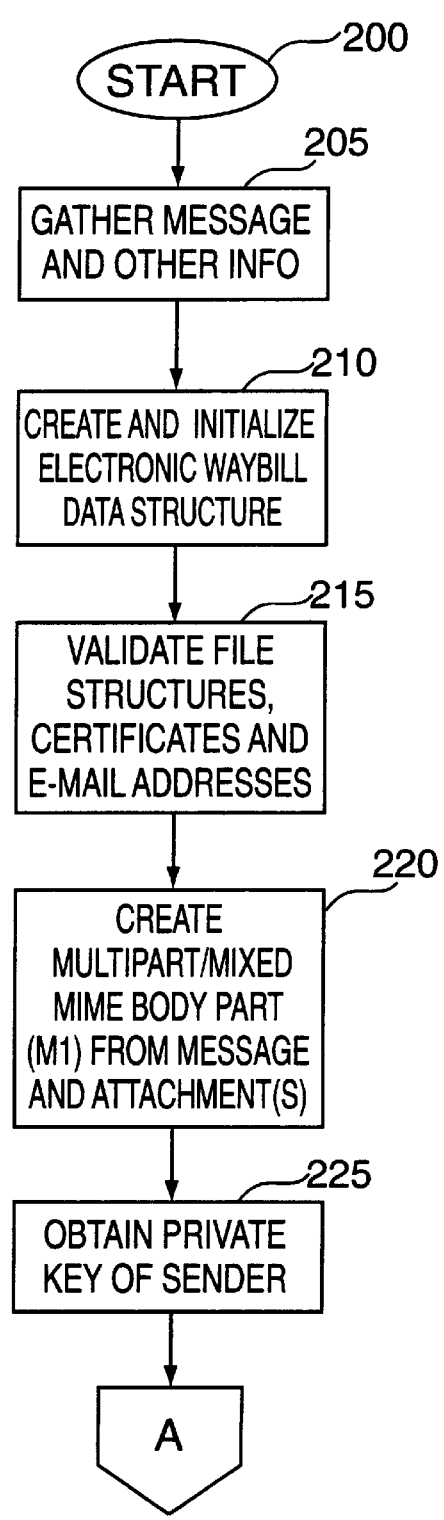
Figure 2B:
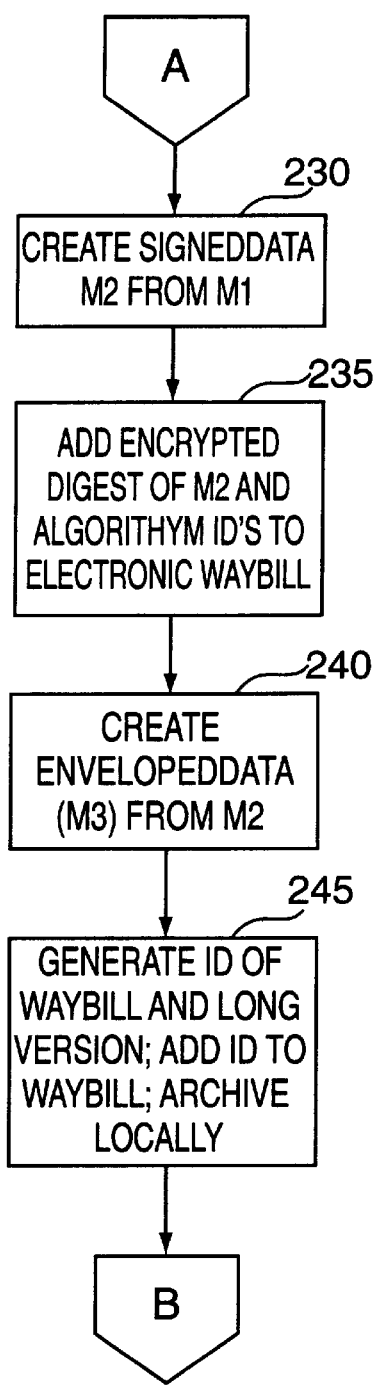

Once the message is constructed, conventional software logic is used to trigger the exemplary transmitter logic, illustrated in FIGS. 2A–C. This logic executes as an independent thread on a client, e.g., sender 105, and is constructed with conventional programming techniques.

The logic starts in step 200 and proceeds to step 205. In step 205 the message to be securely transmitted is gathered along with other information. The message may be of any content type, but an easy-to-understand example would be a text message. The other information gathered includes a copy of a digital certificate for the sender 105 and the recipient(s) 120, a subject of the message, an account code, filenames, if any, to be attached, and information identifying the desired service levels and options to be performed, e.g., local archiving, electronic notarizing, etc.

The logic proceeds to step 210 in which an electronic waybill data structure is created and initialized. An exemplary waybill structure includes a local date/time stamp including a time zone, the subject text, the filenames of any attachments, the e-mail address and digital certificate of sender 105, addresses and certificates for the recipient(s) 120, an account code, and client's billing code.

The logic proceeds to step 215 in which the file structures of any attachments, the recipient's e-mail address, and the certificates for any recipient(s) and for the intermediary 115 are validated. Conventional techniques are used to validate the file structures and e-mail addresses. To validate the certificate, the structure of the certificate is checked and the date is compared to the validity date information on the certificate itself.

The logic proceeds to step 220 in which a multipart/mixed MIME body part, referred to as M1, is created. M1 is created using conventional techniques to combine the message, the attachments, and the subject value gathered in step 205.

The logic proceeds to step 225 in which the private key associated with sender 105 is obtained using conventional techniques for accessing private keys.

The logic proceeds to step 230 in which a signedData structure is created, referred to as M2. More specifically, a 160-bit digest of M1 is created using the SHA-1 digest algorithm, and the resulting digest is then encrypted using the sender's 105 private key and RSA-encryption. (Though other digest algorithms are known, e.g., MD5, unless otherwise noted the exemplary embodiment uses the SHA-1 digest algorithm to form digests.) M2 is formed by combining M1 with the encrypted message digest, along with the corresponding algorithm identifiers. As will be clear from later description, M2 may eventually be used by the recipient 120 to authenticate that the contents of M1 are unaltered and that M1 originated from sender 105.

The logic proceeds to step 235 in which the encrypted digest of M1 and the algorithm identifiers are added to the electronic waybill. The encrypted digest of M1 in the waybill is referred to as SDM1. This information is included in the waybill to facilitate the archiving of the same by the intermediary 115 and to facilitate the processing of certain requested services, e.g., notary services.

The logic proceeds to step 240 in which an envelopedData structure, referred to as M3, is created from M2. A 40-bit symmetric key is generated. M2 is then encrypted using the key and the RC5 block cipher encryption algorithm. For each recipient, the key is encrypted with the recipient's public key using RSA-encryption. The corresponding algorithm identifiers are included in the envelopedData structure. The resulting envelopedData may be thought of as the inner envelope, outlined above. The content of the envelope is encrypted in a fashion that may be decrypted only by recipient 120 because only recipient 120 has the private key needed to decrypt the encrypted symmetric key. If a local archiving option is selected as a service during the initial step 205, the envelopedData would include the sender as a recipient. (As will be explained later, this will cause the message to be returned to the sender, where it will be stored locally)

The logic proceeds to step 245 in which a unique waybill ID is constructed and included in the waybill structure. To create the ID, a CRC value is generated of the encrypted message M3 and a digest of the encrypted message is generated. Date information is then concatenated with a digest of a string consisting of the CRC and the digest value of the encrypted message. Because the ID is constructed with a digest value, a theoretical possibility exists of a hash collision, and therefore, a long version of the ID is also created to help resolve collisions if needed. (A hash collision is a known event in which two strings, each unique, result with the same hash value) The long version consists of the concatenated string of the date information, the CRC, and the digest value of the encrypted message. The long version of the ID is included in the waybill and stored locally. Various aspects of the above transactions may be locally archived, if selected. For example, using conventional techniques, sender 105 may archive the ID, the digest of the message M1 the digest algorithm identifier, e-mail addresses and certificates for the recipient(s) 120, subject text, filenames, message length, and various information specific to the services requested, e.g., insurance level, notary information, etc.

The logic proceeds to step 250 in which another multipart/mixed MIME body part is created, referred to as M4. M4 includes a copy of the electronic waybill data structure and envelopedData M3.

The logic proceeds to step 255 in which another signed-Data structure, referred to as M5, is created from M4. A digest is formed of M4. The digest is then encrypted using the sender's private key and RSA-encryption. The signed-Data structure is formed by combining the encrypted digest with the content M4, along with the corresponding algorithm identifiers. The digest in M5 may be used to later authenticate that the contents of M5 are unaltered and that message originated from sender 105.

The logic proceeds to step 260 in which another envelopedData structure is created, referred to as M6. M6 is created by encrypting M5 using a 128-bit symmetric key and RC2 block cipher encryption algorithm. The symmetric key, in turn, is encrypted with the public key associated with trusted intermediary 115 and with RSA-encryption. The above data are combined with the algorithm identifiers to form the envelopedData structure. M6 may be thought of as the outer envelope, outlined above. M6 is in a believed-to-be-novel form called S/MIME-3P. An exemplary structure 600, thus constructed, is shown in FIG. 6, which uses notation known in the art. A later section will provide a S/MIME- and other standards-compliant description of the S/MIME-3P structure.

The logic proceeds to step 265 in which M6 is sent to the intermediary 115 using SMTP services. The package thus sent will have its informational content encrypted as inner and outer envelopes as described above. If an electronic eavesdropper monitored the communication channel, the only information it could determine is that a package was being delivered from sender 105 to intermediary 115.

Step 270 performs maintenance functions such as notifying the user that the document was sent and providing the waybill ID to the user.

The logic proceeds to step 299, which ends the flow.

Processing of Message Packages by an Exemplary Trusted Intermediary

An exemplary embodiment of trusted intermediary 115 includes a Unix-based server, including a MIME- and S/MIME-enabled e-mail system having SMTP services (or other network transport access) and a database system 117. It would also include RSA security service software and would include key and certificate management software. It would also include hardware security mechanisms, such as hardware tokens, for the storing and processing of private keys. Though FIG. 1 suggests intermediary 115 as a single physical entity, intermediary 115 may involve several physical entities addressable as one logical entity; in this regard, conventional techniques may be used for routing messages to the appropriate physical entity.

Similar to sender 105, the trusted intermediary 115 uses conventional programming techniques for receiving packages from the network 110 and routing the relevant portions thereof to the proper software. In this fashion, the package containing M6 will be routed to e-mail software on the intermediary 115. The e-mail system will recognize that the package is of S/MIME-3P format and invoke the corresponding software logic to execute as a separate thread.

Figures 3B, 3C:
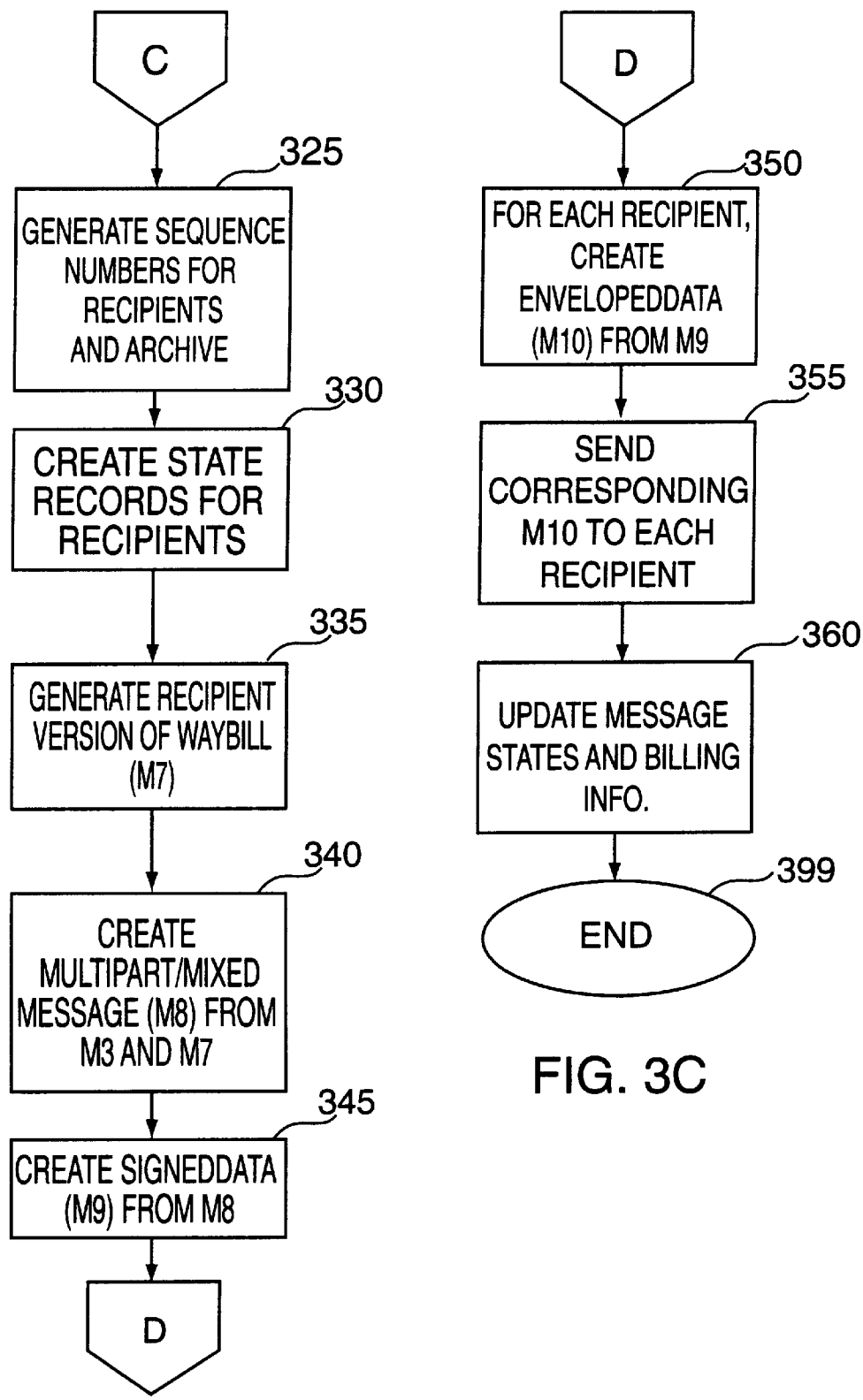

A flowchart illustrating the relevant intermediary software logic that is invoked in response to receiving a S/MIME-3P package is shown in FIGS. 3A–C. The logic begins in step 300 and proceeds to step 305 in which the S/MIME-3P message M6 is received.

The logic proceeds to step 310 in which M6 is decrypted and validated. To do this, the envelopedData M6 is decrypted by first decrypting the 128-bit symmetric key using the trusted intermediary's private key and the RSA-decryption algorithm and then using the decrypted symmetric key with the RC2 block cipher decryption algorithm to recover the contents. The recovered contents thus produced is a signedData structure M5.

From the decrypted M6, the encrypted message digest of M5 is decrypted with the sender's public key, and the digest is then used to authenticate the contents of M5 and the sender's identity. This is done by forming a digest of M5 and comparing it to the decrypted digest. If the two are equal, M5 is guaranteed to have been unaltered during transit and to have originated from sender 105. The core contents of M5 is the waybill structure, the inner envelope, and the digital signature.

This being done, the sender's digital certificate is obtained from the waybill and validated. As part of the validation, the intermediary 115 accesses some stored data records having information characterizing the CA associated with the sender's certificate; for example the characterizing information may include a computer code representative of a security ranking that was formed from an audit of the CA's Certificate Practice Statement (CPS). (A CPS is a text document that describes the CA's vetting procedures, among other things.) The CA's digital certificate is then obtained and used to verify that the CA's signature is on the sender's certificate. The sender's certificate is then analyzed to determine whether it is valid in accordance with its stated duration date, whether it is valid with respect to known CRLs, and whether it is valid with respect to its stated usage type. Moreover, validation of the sender's certificate could include a determination of whether it contains a valid e-mail address for the sender 105.

In addition, from the decrypted outer envelope, the electronic waybill is obtained and validated. This validation of the waybill includes determining whether the waybill ID is unique with respect to past known IDs. If it is not unique, a recovery process is initiated in which the intermediary 115 asks the sender 105 to re-transmit the message; this retransmission would involve a generation of a new ID. Validation of the waybill further includes validating all of the digital certificates included in the waybill, i.e., for the sender 105 and the recipient(s) 120.

The service-related information of the waybill is then processed. Among other things, this entails verifying that the account number is valid and capturing any restrictions associated with the account. From this, the requested service levels can then be compared to any customer restrictions. Likewise, the results of the certificate validation can be compared to the requested authenticity levels. In this fashion, if the recipient's CA uses less stringent vetting procedures than desired by the sender 105, the processing may be aborted, if so requested; alternatively, insurance rates associated with the transaction may be modified to reflect the least secure entity.

The logic proceeds to step 315 in which a confirmation message is sent to sender 105, referred to as Confirm 1. This message indicates that the intermediary 115 has received the package and processed it accordingly and includes corresponding status information. The structure of Confirm 1 is believed-to-be in a novel format, referred to as S/MIME-Confirm. This structure as well as the information it may contain and the process of forming it are described in a later section. An alternative embodiment omits this step, and another embodiment sends the confirmation at a later step in the process, after a new version of the package has been transmitted to recipients.

The logic proceeds to step 320 in which the data elements of the waybill obtained from the decrypted message M6 are archived in database 117 along with other information. The other information includes a digest of M6, referred to as IEM6, which is formed as part of this step. This archiving allows the message delivery to be tracked and facilitates the processing of certain services, such as electronic notarization.

The logic proceeds to step 325 in which sequence numbers are generated for the indicated recipient(s) 120. The sequence numbers will be used later to check the status of the delivery. The sequence numbers will be used in constructing a new version of the waybill (more below), and they are also archived.

The logic proceeds to step 330 in which state records are created and initialized for each recipient using conventional database programming technique. The state records are used for monitoring the status of transactions; for example, a state record may indicate that a message was received from the intermediary, that a confirmation (Confirm 1) was sent to sender 105, that a package was processed by intermediary 115 and that a new version of the package was sent to recipient 120. As the processing of transactions proceed, the intermediary 115 updates the relevant state records. The state records also include timers to time various events. The timers are used to detect and respond to potential problems. For example, if a package is non-deliverable to a recipient(s) 120 for a predetermined time, an indicative message may be sent to sender 105. Likewise, if an expected confirmation has not been received from the recipient 120 for a predetermined time, an indicative message may be sent to the sender 105.

The logic proceeds to step 335 in which a new version of a waybill is generated for each recipient. Relative to the old waybill (i.e., the waybill contained in M6), the new waybill excludes information that is relevant only to the intermediary. The only information in the new waybill that did not exist in the old waybill is the newly-formed sequence numbers. More particularly, the new waybill includes the waybill ID, the sequence numbers, the relevant e-mail addresses, message length of M1, subject text, message origination time stamp, filenames of attachments, and service and option related information. For convenience, the new waybill is called M7.

The logic proceeds to step 340 in which a multipart/mixed message is generated, referred to as M8. M8 is formed by combining M3, i.e., the inner envelope, with the newly-formed waybill M7.

The logic proceeds to step 345 in which a new signedData structure, referred to as M9, is created. M9 is formed by digesting M8 and encrypting the digest using the intermediary's private key and RSA-encryption. Analogously to that described above, all the relevant algorithms are identified in the signedData structure.

The logic proceeds to step 350 in which envelopedData structures, referred to as M10, are created from M9. A 128-bit symmetric key is generated and used to encrypt M9 according to the Triple DES block cipher encryption algorithm. For each recipient, the symmetric key is then encrypted using that recipient's public key and RSA-encryption. The combination of symmetrically-encrypted contents and publicly-encrypted key are combined to form the envelopedData structure. There is one M10 structure per recipient. M10, like M6, is in the novel S/MIME-3P format.

The logic proceeds to step 355 in which the corresponding M10 is sent to each recipient 120. This step uses conventional SMTP services. M10 is the new version of the package, referred to in the description of FIG. 1.

Under an alternative embodiment, such as the one in FIG. 1B, step 350 sends a simple text message to the recipients indicating that there is a package at the HTTP server 125. As will be explained below, it will be the responsibility of the recipient to obtain the message from the HTTP server.

Under another alternative embodiment steps 340–350 are modified so that M3 is not re-encrypted as part of forming the new package. This will sacrifice the extra privacy obtained from double encryption but can save processing cycles in forming the new package M10. (Doubly-encrypting the message provides added privacy. The above technique of encrypting at 40 bits then 128 bits yields an effective encryption roughly equivalent to a 256 bit encryption.)

The logic proceeds to step 360 in which the message states in the state records are updated for each recipient, and the new status information is indicated to the billing system.

The logic proceeds to step 399, which ends the flow of logic.

Exemplary Receiver

Under an exemplary embodiment, a receiver has a suitably-equipped personal computer similar to that described for the exemplary transmitter.

Figure 4A:
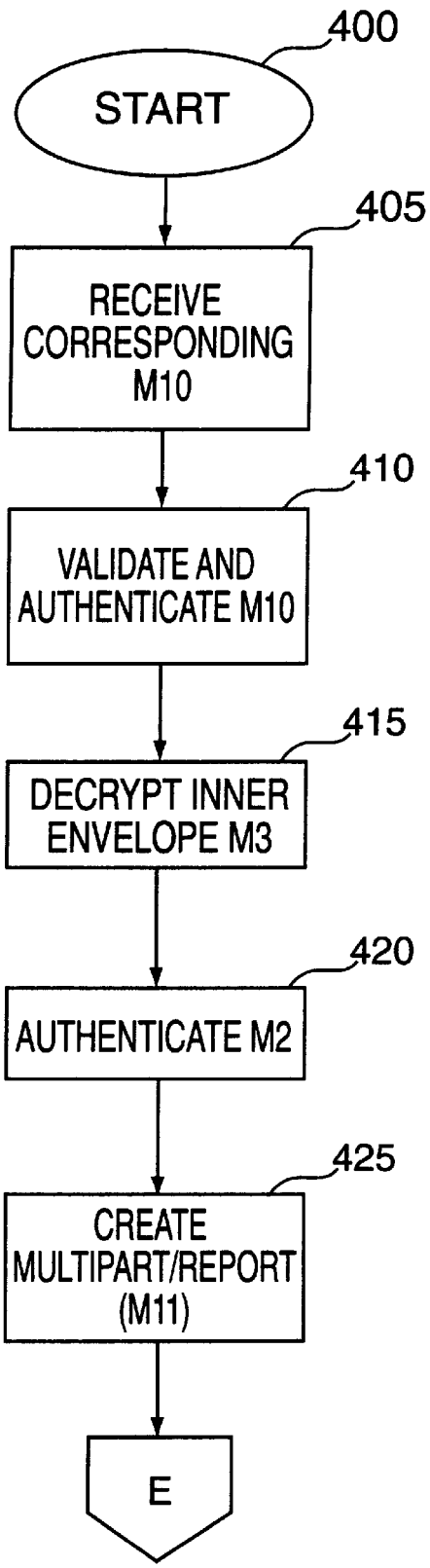
FIGS. 4A–B are a flowchart of exemplary receiver logic.
Figure 4B:
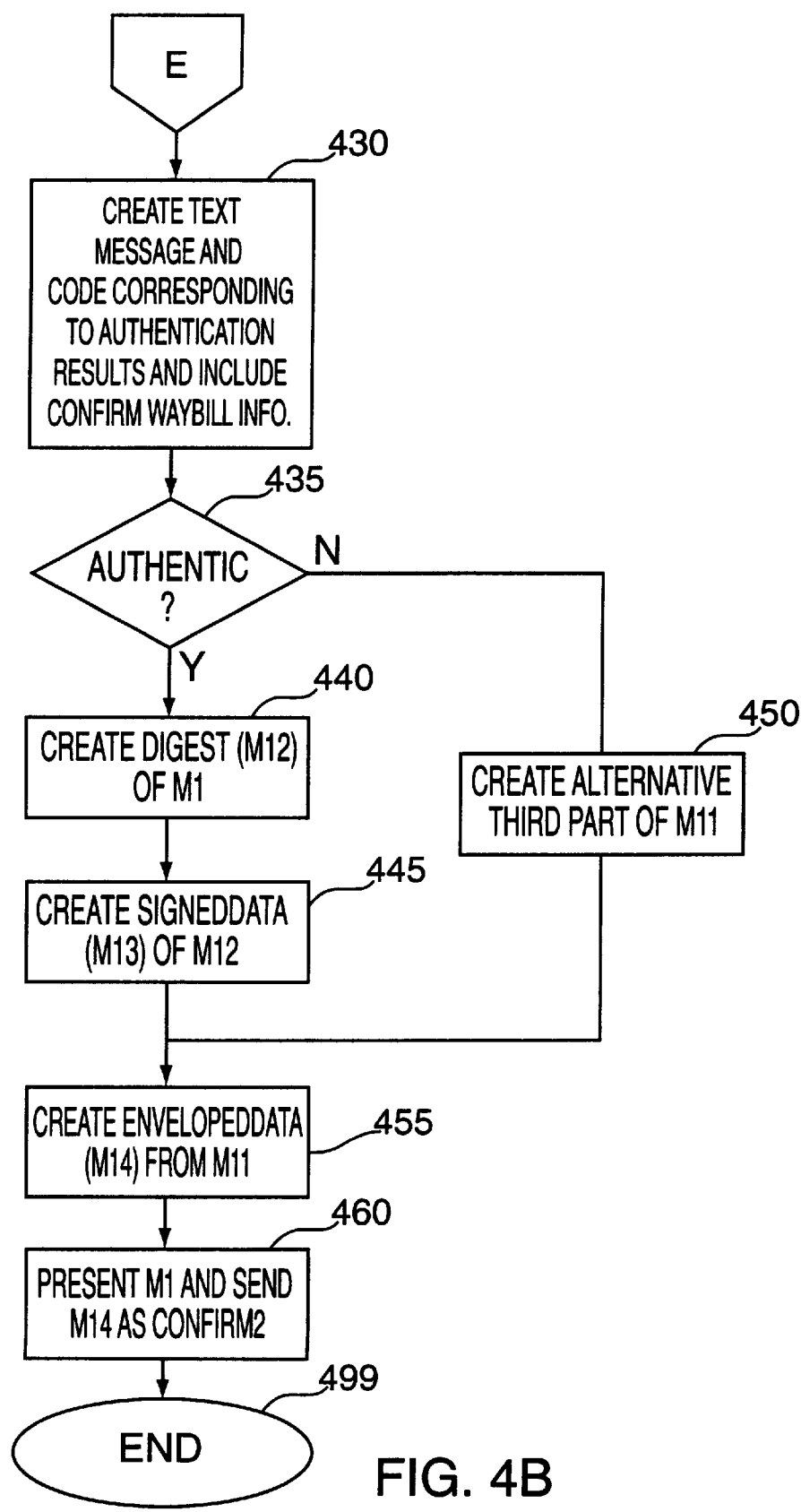

Upon receipt of the package containing M10, conventional software is used to route M10 to, and invoke, the exemplary receiver logic, illustrated in FIGS. 4A–B. This logic executes as an independent thread on a client, for example, recipient(s) 120, and is constructed with conventional programming techniques.

The logic starts in step 400 and proceeds to step 405 in which the S/MIME-3P package M10 is received.

The logic proceeds to step 410 in which M10 is validated and authenticated. Much of this validation is analogous to that described above in relation to the intermediary 115 receiving M6. More specifically, the envelopedData M10 is decrypted by first decrypting the 128-bit symmetric key using the recipient's private key and RSA-decryption. Then, the decrypted symmetric key is used with the Triple DES decryption algorithm to recover the contents of M10, that is, signedData M9. The encrypted message digest of M9 is decrypted with the intermediary's public key and with RSA-decryption. Then, a new digest of recovered M9 is formed and compared with the decrypted digest. If the two are equal, M9 is guaranteed to have been unaltered during transit and to have originated from intermediary 115. Thus, the core contents of M9, that is, multipart message M8, are authentic.

The logic proceeds to step 415 in which the inner envelope M3 is obtained from authenticated M8 and then decrypted. The encrypted symmetric key is decrypted using the recipient's private key and RSA-decryption. This recovers the 40-bit key first encrypted by the sender 105 in step 240. The decrypted key is then used with RC5 cipher block decryption to recover signedData M2, the core contents of which is the original multipart message M1.

The logic proceeds to step 420 in which M2 is authenticated. The encrypted message digest of M2 is decrypted using the sender's 105 public key. A digest of M2 is then formed, and the newly-formed digest is compared to the decrypted digest. If the two are equal, M2 is guaranteed to have been unaltered in transit and to have originated from sender 105. The recipient 120 is able to determine that the public key for sender 105 should be used in decrypting the digest by reference to the information contained in the new waybill, in particular the sender's 105 certificate.

The logic proceeds to step 425 in which a multipart/report MIME structure, referred to as M11, is created.

The logic proceeds to step 430 in which a human-readable text message and a computer code are generated, both corresponding to the authentication results. The text message and computer code are inserted, respectively, into first and second body parts of the M11. For example, the code and message would indicate that the structure having the original message (M1) was authenticated at the particular recipient 120. The computer codes may be modeled after S/MIME standards-related document RFC 1892. The second body part also includes confirm waybill information. This information includes the ID, the sequence number, the relevant e-mail addresses and certificates, service-related information, such as the insurance level, the filenames of any attachments, the length of M1, and time stamp information.

The logic proceeds to step 435 in which the authentication results are tested.

If the results indicate M1 was authentic and originated from sender 105, the logic proceeds to step 440.

In step 440, a digest (M12) is created of M1. This digest is also referred to as RDM1.

The logic proceeds to step 445 in which a signedData structure, referred to as M13, is created from M12. This is done by creating a digest of M12 and then encrypting the digest using the recipient's private key and RSA-encryption. The signedData M13 is then contained in a third body part of M11.

If the authentication step 435 indicates that M1 was somehow not authentic, the logic proceeds to step 450 in which an alternative third body part of M11 is created and inserted. The third body part in this case would have an error code indicative of the cause for non-authentication.

In either case, the logic proceeds to step 455 in which an envelopedData structure, referred to as M14, is created from M11. M11 is encrypted using RC2 encryption and a 128 bit key. The key is then encrypted with the public key of intermediary 115.

Figure 7:
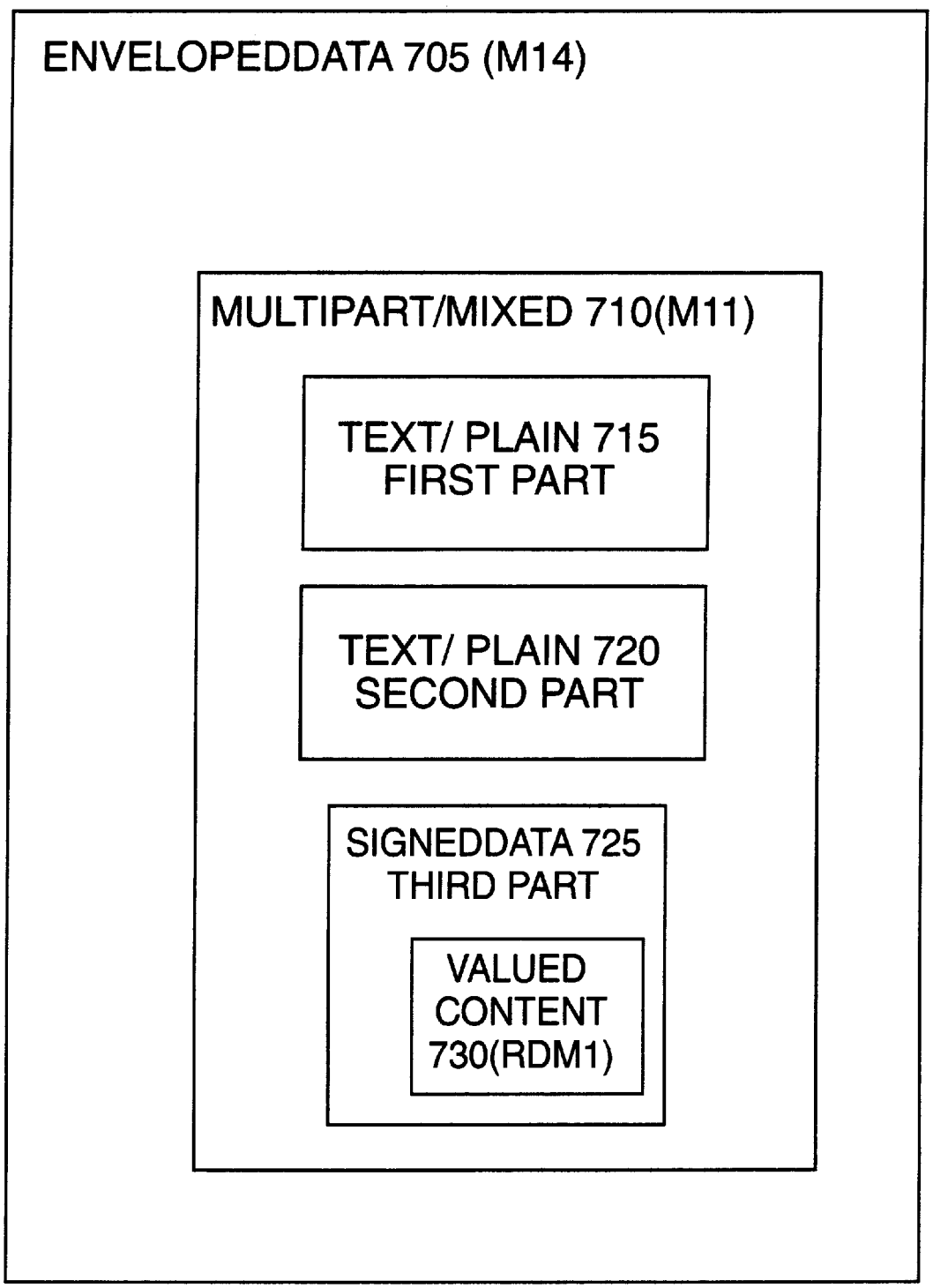
FIG. 7 is an exemplary data structure for containing a confirmation message.

Step 435 through step 455 produce an exemplary S/MIME-Confirm structure. FIG. 7 illustrates an exemplary structure, using notation known in the art, in which the third part includes RDM1.

The logic proceeds to step 460 in which M1 is presented to the recipient and M14 is sent to intermediary 115 using SMTP services. In all, the logic above is transparent to the user in that the user is never "asked" whether or not to send an acknowledgement.

The logic proceeds to step 499, which ends the flow.

Under an alternative embodiment, shown in FIG. 1B, the triggering events of the above flow are different. In particular, the intermediary 115 sends an informational message to the recipient 120. This message for example may contain a URL pointer to a package being held by HTTP server 125. Eventually, the informational message is received by a user at the recipient site 120 and the user may initiate actions to obtain the package. These actions could include launching the URL to cause the recipient to download the package, or it could include the user "logging into" the HTTP-related website. Once the user causes the recipient to download the package, the processing of the package is analogous to that shown in FIG. 4.

Moreover, under another embodiment, the recipient is informed of the sender's identity before the package is opened. This is accomplished by including information identifying the sender in a subject field of the package delivered to the recipient.

Processing of Confirmation Packages by an Exemplary Trusted Intermediary

As described above, the trusted intermediary 115 uses conventional programming techniques for receiving packages from the network 110 and routing the relevant portions thereof to the proper software. In this fashion, the package containing Confirm 2 will be routed to e-mail software on the intermediary 115. The e-mail system will recognize that the package is of S/MIME-Confirm format and invoke the corresponding software logic to execute as a separate thread.

Figure 5:
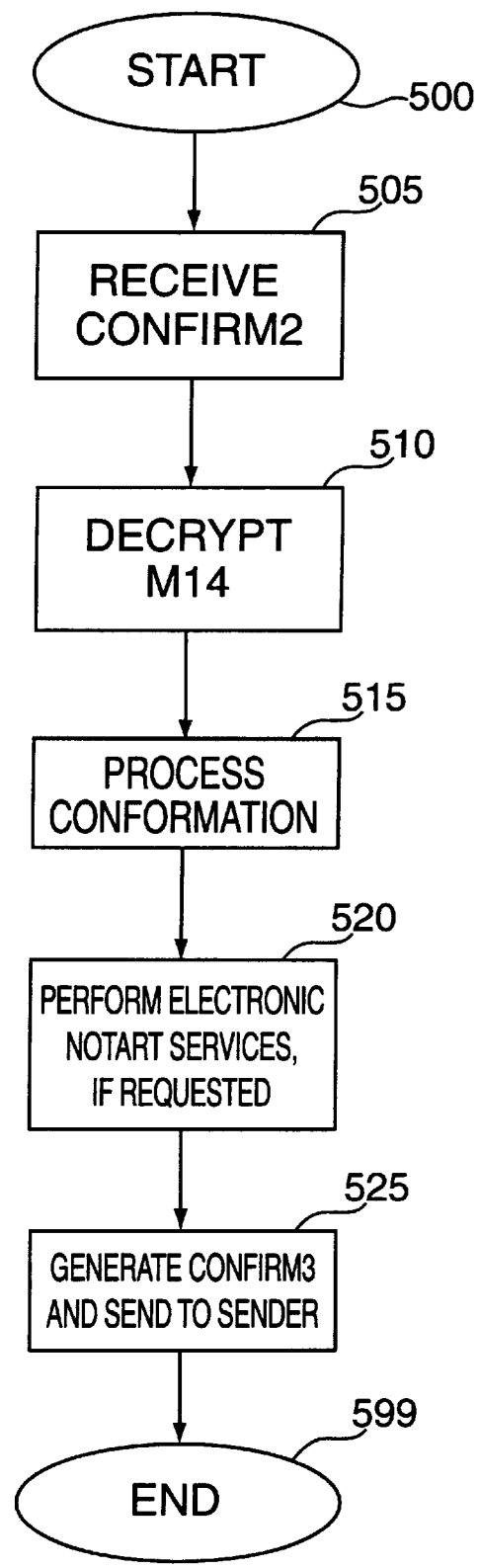
FIG. 5 is a flowchart of exemplary intermediary logic for processing confirmation messages.

A flowchart illustrating the relevant confirmation processing software logic of intermediary 115 is shown in FIG. 5. This logic is invoked in response to receiving a S/MIME-Confirm package. The logic begins in step 500 and proceeds to step 505 in which the Confirm 2 message is received.

The logic proceeds to step 510 in which M14 is decrypted. To do this, the encrypted symmetric 128-bit key in M14 is decrypted using the trusted intermediary's private key and RSA-decryption, and the decrypted symmetric key is used with the RC2 decryption algorithm to recover the contents, that is, multipart/report M11.

The logic proceeds to step 515 in which the confirmation message is processed. More specifically, the ID of the confirmation waybill is used to obtain stored data about this transaction. The sequence number for the relevant confirmation is then used to update the relevant state records and other stored data for this transaction. For example, the state records would be updated to indicate that this particular recipient has confirmed receipt of the message. The confirmation results, also included in the confirmation waybill, are likewise used to indicate whether M1 was authenticated by recipient 120. The third body part of M11 is accessed to authentic the contents thereof, i.e., RDM1, and if authentic, the third body part is also archived.

The logic proceeds to step 520 in which it is determined whether electronic notary services were requested. This service requests information that has been archived and also passed as part of the waybill structures. The information may further indicate the type of notary services desired.

Under an exemplary embodiment, electronic notarization is performed as follows. The SDM1, IEM6, and RDM1 are obtained from the database 117. A digest, referred to as a notary hash, is then created of the combination SDM1+IEM6+RDM1 wherein '+' indicates concatenation. The notary hash is then sent to an electronic notary service, e.g., Surety Corporation Notary Services available on the Internet, and the resulting notary seal as well as the notary hash are archived.

The logic proceeds to step 525 in which a confirmation message Confirm 3 is generated and sent to sender 105. This Confirm 3 message is of the S/MIME-Confirm type and is sent after all recipients have confirmed receipt to the intermediary 115.

The logic proceeds to step 599, which ends the flow.

Processing of Message Verification Requests by an Exemplary Trusted Intermediary The trusted intermediary 115 includes a database 117 for archiving information. As outlined above, the principal data that are stored were passed to it as part of the original waybill, but other stored data, such as sequence numbers and notary hashes, were generated and archived as part of the transaction processing. Moreover, the database 117 also includes the state records referred to above.

This stored information may be accessed as part of "normal" operations such as confirmation processing and notary services. The information may also be accessed by authorized users as a "verification request." Verification requests allow authorized entities to track, or monitor, the delivery; they also allow authorized entities to obtain information about transactions that have been completed. Originating senders, recipients, and authorized account agents are permitted access to archived data for a particular transaction. In this regard, it should be appreciated that database 117 includes conventional mechanisms for having active storage and "old" storage. The old storage is for transactions that have been completed a predetermined time in the past or earlier. This information may reside on storage devices separate from those used to hold active storage.

Figure 8:
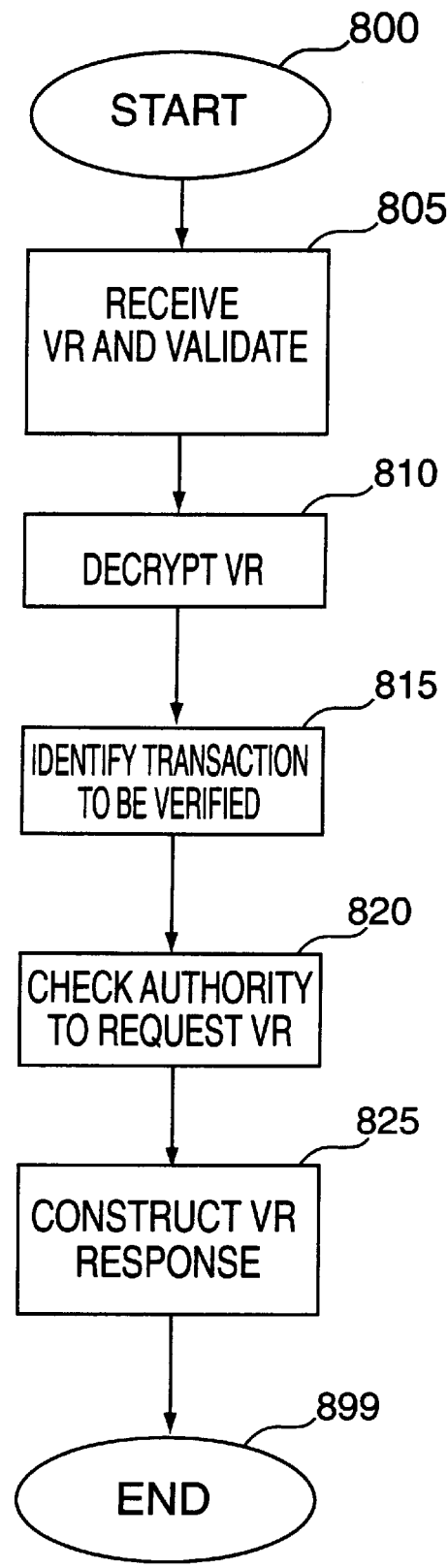
FIG. 8 is a flowchart of exemplary intermediary logic for handling verification requests.

FIG. 8 is a flowchart of exemplary intermediary logic for the handling of verification requests (VRs). To send a request, the authorized user creates a S/MIME-3P structure, analogously to that described above, except that the inner and outer envelopes are encrypted with the intermediary's public key. Also, in this case, the waybill portion 620 includes computer codes indicating the verification transaction desired. Upon receiving such a package, the intermediary routes the package to a verification request engine, based on an identifier in the package indicating that the package is a verification request and not a "normal" 3P package.

The logic starts in step 800 and proceeds to step 805. In step 805, the VR is validated similarly to that described above for normal 3P packages. The logic proceeds to step 810 in which the package is decrypted and the computer code, indicating the desired transaction, is recovered. This step might also entail sending a message to billing software. The logic proceeds to step 815 in which the relevant transaction is identified. In some instances this is trivial, for example, when the VR identifies the transaction explicitly by ID. In other cases the information supplied with the VR is used to construct a search request of the database 117. In this regard, conventional techniques are employed for the storing, searching, and accessing of stored information. The logic then proceeds to step 820 to check the VR sender's authority with regard to the VR. This entails checking that the VR sender's ID is registered with the system as active, that the VR sender's account number is active and registered, and that a trusted CA can be found that is active and that is associated with the VR sender. If the above are true, the authorization step then determines whether the VR sender is the sender of the original message, one of the recipients of the original message, or a registered agent for the account charged for the original message. If the authorization fails an indicative message is sent to the sender (more below). The logic then proceeds to step 825 in which a response to the VR is constructed and sent to the VR sender. The core contents of the inner envelope includes the database search results. This response is constructed into a 3P package and is eventually handled by the sender's receiver logic, analogously to that described above. The waybill includes status information, indicating whether the authorization passed or failed, among other things, and the inner envelope contains the search results from the VR as an attachment. A textual summary of the verification results are included in first body part 715.

S/MIME-3P Structure

As described above, an exemplary embodiment defines and uses a format, referred to as S/MIME-3P. More specifically, packages M6 and M10 are S/MIME-3P structures, as are verification requests. It is envisioned that other applications may benefit from a trusted intermediary of some sort (not necessarily the same as intermediary 115) and that, consequently, the novel S/MIME syntax-compliant structure described below has utility in itself and beyond the embodiment above.

The corresponding protocol for forming the S/MIME-3P packages is called "application/x-smime3p." In this fashion, MIME agents can use the protocol designation in routing the message to, and invoking, the appropriate software.

A formal definition for the S/MIME-3P structure is provided below. Skilled artisans will appreciate that this is a genus-type definition of the structure and that a species-type implementation was described above in relation to M6 and M10.

Part 1:

Content-type: {any valid MIME or S/MIME type}

Protocol: application/x-smime3p-track

Part 2:

Content-type: application/x-pkcs-7-mime {envelopedData}

Protocol: application/x-smime3p-package

FIG. 6 represents the elements of an exemplary S/MIME-3P structure 600 like that used for M6 and M10. This is but one species-type implementation of the formal genus-type definition above. In particular, the S/MIME-3P structure 600 is envelopedData 605. In the examples above, envelopedData 605 is the outer envelope. (Unless otherwise stated, within this section, reference to terms such as envelopedData, signedData, or the like means those terms as defined in PKCS7 and S/MIME implementation guide v2.0.)

The core contents of envelopedData 605 is signedData 610. To get signedData 610 from envelopedData 605, the appropriate decryption techniques must be applied to envelopedData 605. This entails accessing the algorithm identifiers of 605 and applying the corresponding techniques. In the examples above, this involved using the recipient's private key to decrypt a symmetric key, which, once decrypted, is used to decrypt the contents.

The core contents of signedData 610 is multipart/mixed message 615. SignedData 610 may be used to authenticate the contents of multipart/mixed message 615. This entails decrypting the encrypted digest of 610 using the originator's public key. A new digest of 615 is formed using the same algorithm used to form the encrypted digest. The newly-formed and decrypted digest are compared. If the digests are equal, 615 is guaranteed to have been unaltered and to have originated from the originator indicated.

The core contents of multipart/mixed message 615 are a plain section 620 and another envelopedData structure 625. In the examples above, plain section 620 contained the waybill information, and envelopedData structure 625 is the inner envelope.

The core contents of envelopedData structure 625 is another signedData structure 630. To get signedData 630 from envelopedData 625, the appropriate decryption techniques must be applied to envelopedData 625, analogously to that described above with reference to envelopedData structure 605.

The core contents of signedData 630 is valued content 635. SignedData 630 may be used to authenticate the contents of valued content 635, analogously to that described above with reference to signedData 610.

The valued contents 635 is application specific. In the examples above, this included the text message that the sender 105 desired to send.

S/MIME-Confirm Structure

As described above, an exemplary embodiment defines and uses a believed-to-be novel message format, S/MIME-Confirm. More specifically, Confirm 1, Confirm 2, and Confirm 3 are S/MIME-Confirm structures, as are verification results. It is envisioned that other applications may benefit from a trusted intermediary of some sort (not necessarily the same as intermediary 115) and that, consequently, the novel S/MIME syntax-compliant structure described below has utility in itself and beyond the embodiment above.

The corresponding protocol for forming the S/MIME-Confirm packages is called "application/x-pkcs7-confirm-message." In this fashion, corresponding MIME agents can use the protocol designation in routing the message to, and invoking, the appropriate software.

A formal definition for the S/MIME-Confirm structure is provided below. Skilled artisans will appreciate that this is a genus-type definition of the structure and that a given species-type implementation was described above.

Part 1:
  Content-type: Text/Plain
  Protocol: application/x-smime-confirm-text
Part 2:
  Content-type: Text/Plain
  Protocol: application/x-smime-confirm-machine
Part 3:
  Content-type: application/octet/stream
  Protocol: application/x-netdox-confirm-digest FIG. 7 represents the elements of an exemplary S/MIME-Confirm structure 700, such as the one used for Confirm 2. This is but one implementation of the formal definition above (i.e., a species-type definition). In particular, the S/MIME-Confirm structure 700 is envelopedData 705. (Unless otherwise stated, within this section, reference to terms such as envelopedData, signedData, or the like means those terms as defined in PKCS7 and S/MIME implementation guide v2.0.)

The core contents of envelopedData 705 is multipart/mixed message 710. The core contents of multipart/report 710 are the following three parts:

Part 1:
  S/MIME-confirm-message 715: this is a text/plain section intended to be a human readable message reflecting the results of the processing.
Part 2:
  S/MIME-confirm-message 720: this is a text/plain section intended to be a machine readable code reflecting the results of the processing. This allows for direct machine processing of the message's contents. The codes may include those in RFC 1892, a request for comments document known in the art.
Part 3:
  S/MIME-confirm-message 725: this is intended to include information appropriate to authenticate the contents of the received message. An exemplary message 730 is the use of signedData, the core content of which is a digest of the message being confirmed. Thus, in an example above, a digest was formed of the authenticated M3 message, which in turn was signed by recipient 120. As an alternative, part 3 may be envelopedData, encrypted for an eventual recipient, the core content of which could be a signedData structure like that above.

Other Embodiments

Skilled artisans will appreciate that the inventive concepts are not limited to the standards outlined above. For example, proprietary structures may be used instead of PKCS7-compliant structures.

Moreover though exemplary clients are described as including a personal computer, the invention can be extended to other contexts. For example, the sender or recipient could include suitably-equipped fax machines or other equipment capable of handling electronic messages.

Though the network was described with reference to the Internet, skilled artisans will appreciate that the network may use a variety of wire- and wireless-based mediums and that the infrastructure need not be Internet-based.

The exemplary embodiment above includes an encrypted inner envelope that is re-encrypted when the outer envelope is formed. This provides two levels of encryption. Alternatively, when forming the outer envelope, the encrypted inner envelope may be left as is.

The exemplary embodiment has the transmitting logic at one node, the intermediary logic at another node, and the receiving logic at still another node. Some of this logic may be re-distributed. For example some of the transmitting and receiving logic may be performed on the intermediary.

There are many alternative ways of generating, gathering, and accessing the public-private keys pairs besides the use of digital certificates.

Having described an exemplary embodiment, it should be apparent to persons of ordinary skill in the art that changes may be made to the embodiment described without departing from the spirit and scope of the invention.

We claim:

1. A system for use with a communication network to securely transmit a message thereover from a sender to a recipient, via an intermediary capable of performing electronic services, comprising:
  a transmitter having
    first logic to receive the message from a user and to form an encrypted inner envelope using a first cryptographic algorithm, the encrypted inner envelope containing the message in an encrypted form decryptable by the recipient;
    second logic to form a first information structure associated with the inner envelope, the first information structure containing data identifying the recipient as a destination and identifying desired electronic services;

third logic to form an encrypted first information structure using a second cryptographic algorithm, the encrypted first information structure containing the first information structure in an encrypted form decryptable by the intermediary;

fourth logic to receive the encrypted inner envelope and encrypted first information structure and to transmit them as a first package on the communication network;

an intermediary having fifth logic to receive the first package and to decrypt the encrypted first information structure, using the second cryptographic algorithm, to determine the identifying data and the desired electronic services;

sixth logic to process the electronic services;

seventh logic to form a second package, the second package containing the encrypted inner envelope;

a receiver having eighth logic to obtain the second package; and ninth logic to decrypt the inner envelope, using the first cryptographic algorithm, to recover the message and to present it to the recipient.

2. The system of claim 1
wherein the sender includes logic to form a digest of the message and to include the digest in the first package;
wherein the recipient includes logic to form a digest of the decrypted message and to include the digest in a confirmation package addressed to the intermediary;
wherein the intermediary includes
logic, responsive to the desired services indicating electronic notary services as desired, to create a digest of the message received from the sender,
logic to form a value based on the created digest, the digest in the first package, and the digest in the confirmation package, and
logic to have the value time-stamped in a secure manner.

3. The system of claim 1
wherein the intermediary includes
a collection of information, including computer codes indicative of the security procedures underlying digital identities of the sender, the recipient, and other entities;
logic, responsive to the desired services indicating insurance services as desired, to gather the computer codes indicative of the security procedure underlying the digital identities of the sender and the recipient;
logic to analyze the computer codes of the recipient and the sender to form an insurance code value reflective of the security rankings so that the transmission of the message may be charged a corresponding insurance rate.

4. A method of securely transmitting a message from a sender to a recipient, via an intermediary capable of performing electronic services, the method comprising the steps of:

(a) receiving the message from the sender and forming an encrypted envelope using a first cryptographic algorithm, the encrypted inner envelope containing the message and decryptable by the recipient;

(b) forming a first information structure, associated with the inner envelope, the first information structure containing data identifying the recipient as an ultimate destination and identifying desired electronic services;

(c) forming an encrypted information structure using a second cryptographic algorithm, the encrypted first information structure being decryptable by the intermediary;

(d) receiving the encrypted inner envelope and encrypted first information structure and transmitting the inner envelope and encrypted first information structure as a first package on the communication network;

(e) receiving the first package and decrypting the encrypted first information structure, using the second cryptographic algorithm, to determine the identifying data and the desired electronic services;

(f) processing in accordance with the electronic services indicated;

(g) forming a second package, the second package containing the encrypted inner envelope and transmitting the second package on the network;

(h) receiving the second package; and (i) decrypting the inner envelope, using the first cryptographic algorithm, to recover the message and to present it to the recipient.

5. The method of claim 4 further comprising the steps of
the sender forming a digest of the message and including the digest in the first package;
the recipient forming a digest of the decrypted message and including the digest in a confirmation package addressed to the intermediary;
wherein the intermediary
in response to the desired services indicating electronic notary services as desired, creates a digest of the message received from the sender,
forms a value based on the created digest, the digest in the first package, and the digest in the confirmation package,
has the value time-stamped in a secure manner.

6. The method of claim 5 wherein the intermediary includes a collection of information, including computer codes indicative of the security procedures underlying digital identities of the sender, the recipient, and other entities; and wherein the intermediary
in response to the desired services indicating insurance services as desired, gathers the computer codes indicative of the security procedure underlying the digital identities of the sender and the recipient;
analyzes the computer codes of the recipient and the sender to form an insurance code value reflective of the security rankings so that the transmission of the message may be charged a corresponding insurance rate.

7. A system for use with a communication network to securely transmit a message thereover from a sender to a recipient, the system capable of performing electronic services, comprising:

first logic to receive a first package from the sender, wherein the first package includes at least:
an inner envelope encrypted using a first cryptographic algorithm, the encrypted inner envelope decryptable by the recipient; and
an encrypted first information structure associated with the inner envelope, the first information structure containing data identifying the recipient as a destination and identifying desired electronic services, the first information structure encrypted using a second cryptographic algorithm;

second logic to decrypt the encrypted first information structure, using the second cryptographic algorithm, to determine the identifying data and the desired electronic services;

third logic to process the electronic services; and fourth logic to form a second package, the second package containing the encrypted inner envelope, wherein the receiver may obtain the second package and use the first cryptographic algorithm to recover the message.

8. A method of securely transmitting a message from a sender to a recipient, via an intermediary capable of performing electronic services, the method comprising the steps of:

receiving a first package from the sender wherein the first package includes at least:

an inner envelope encrypted using a first cryptographic algorithm, the encrypted inner envelope decryptable by the recipient; and an encrypted first information structure associated with the inner envelope, the first information structure containing data identifying the recipient as a destination and identifying desired electronic services, the first information structure encrypted using a second cryptographic algorithm;

decrypting the encrypted first information structure, using the second cryptographic algorithm, to determine the identifying data and the desired electronic services;

processing the electronic services; and forming a second package, the second package containing the encrypted inner envelope, wherein the receiver may obtain the second package and use the first cryptographic algorithm to recover the message.

* * * * *